United States Patent [19]

Goad et al.

[11] 4,151,031

[45] Apr. 24, 1979

[54] APPARATUS FOR CONTINUOUSLY FORMING COMPOSITE SHAPES

[75] Inventors: Robert C. Goad, San Diego; Fritz F. W. Krohn, Rancho Santa Fe; Gerald D. Peddie, Bonita, all of Calif.

[73] Assignee: General Dynamics Corporation, San Diego, Calif.

[21] Appl. No.: 813,407

[22] Filed: Jul. 5, 1977

[51] Int. Cl.² .............................................. B32B 31/00
[52] U.S. Cl. .................................. 156/201; 156/228; 156/311; 156/324; 156/463; 156/499
[58] Field of Search ........................ 156/196, 200–202, 156/216, 180, 181, 311, 292, 228, 242, 441, 438, 324, 499, 463; 428/307, 302, 188

[56] References Cited

U.S. PATENT DOCUMENTS

| 2,822,575 | 2/1958 | Imbert et al. ..................... 156/200 X |
| 2,976,431 | 4/1961 | Perrault .......................... 156/181 X |
| 2,977,630 | 4/1961 | Bazler ............................. 156/180 |
| 3,298,887 | 1/1967 | Hartesveldt et al. ................ 156/311 |
| 3,649,407 | 3/1972 | Markus ............................ 156/228 X |
| 3,902,938 | 9/1975 | Eller ................................. 156/201 X |
| 4,020,202 | 4/1977 | Kreft .............................. 428/377 X |
| 4,048,360 | 9/1977 | Vonda ............................. 428/377 X |

*Primary Examiner*—David A. Simmons
*Attorney, Agent, or Firm*—John R. Duncan

[57] ABSTRACT

Method and apparatus for forming sheet material into continuous structural shapes, particularly adaptable to the forming and joining of reinforced plastic sheet material, wherein the material is heated, formed, joined, consolidated, and cooled in a continuous process.

5 Claims, 8 Drawing Figures

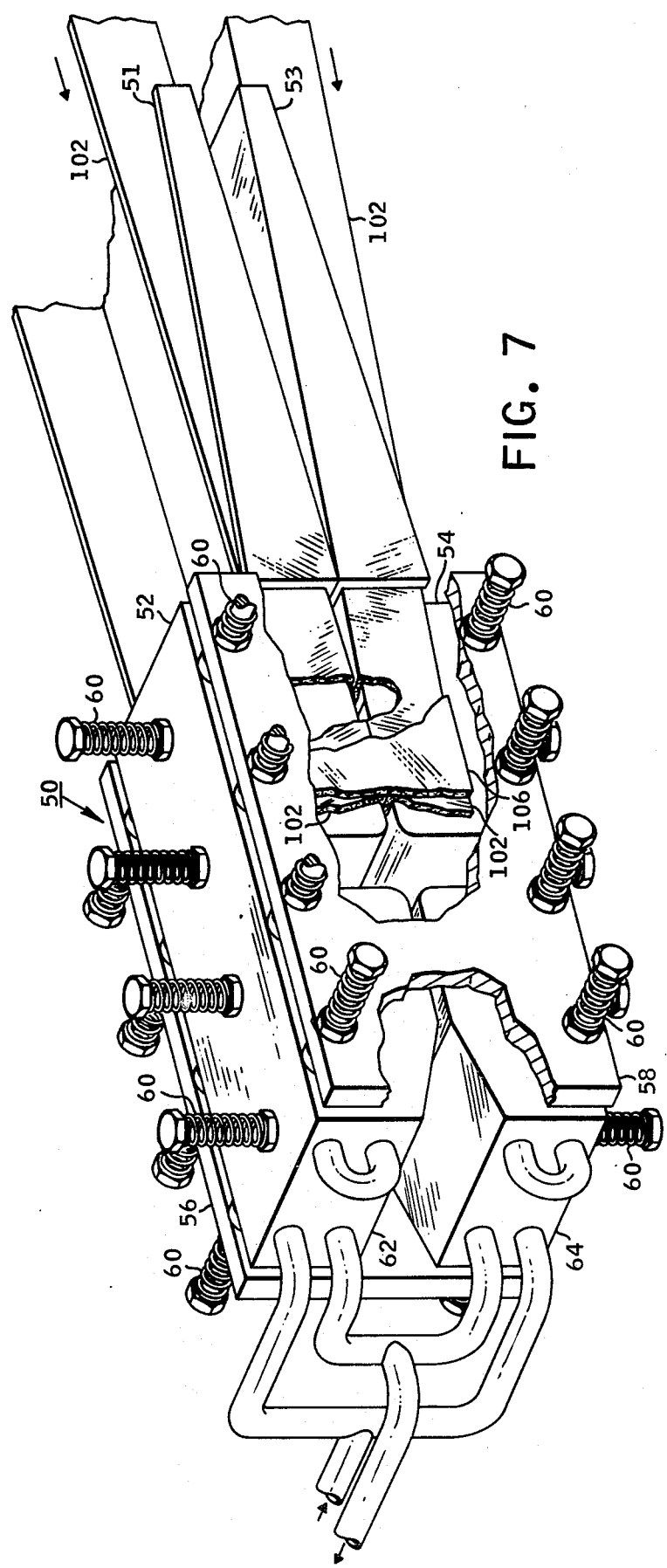
FIG. 7
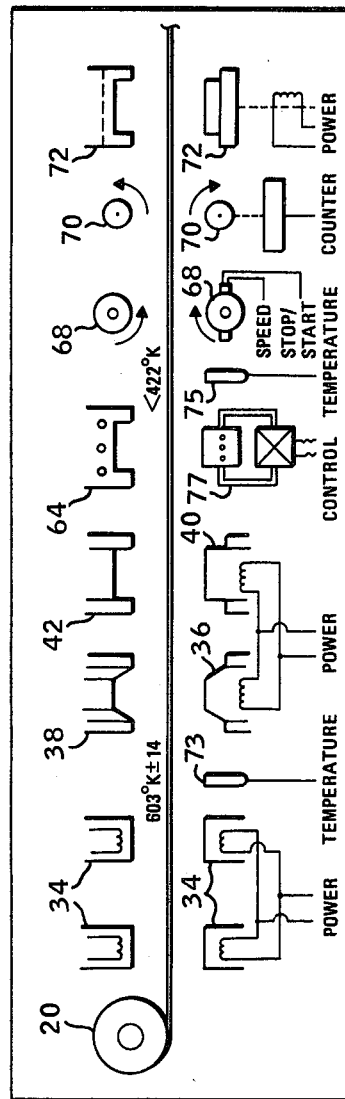
FIG. 8
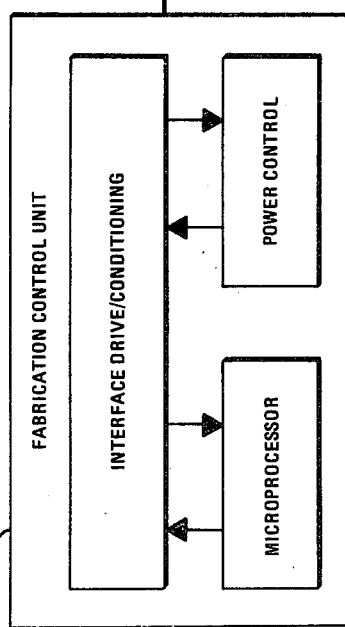

APPARATUS FOR CONTINUOUSLY FORMING COMPOSITE SHAPES

BACKGROUND OF THE INVENTION

This invention relates generally to the manufacture of structural members, such as I-beams, and more particularly to continuous, extremely long, light-weight members. The invention has particular application in the manufacture of plastic and fiber-reinforced composite plastic shapes.

With the advent of earth to orbit transportation in outer space, mission operations will change from one-purpose to continuous operations embracing a wide spectrum of applications. These operations introduce a new dimension in space structures, particularly in such applications as communications, microwave radiometry and power generation. Permanent space platforms, providing common structural and operational support for a variety of space systems, will be extremely large requiring structural members measuring thousands of feet in length.

Prior work on space structures has concentrated on modular metallic structures pre-assembled in volume-consuming packages to fit within the limitations of the space craft's payload volume. To utilize these modules in space to fabricate a large structure requires extensive Extra-Vehicular Activity (EVA) efforts of space crewmen.

The geometry of large light-weight structures in space is dynamicly disturbed by control forces imposed for orientation and positioning of the system. Also, absorbed thermal radiation causes distortion and changes in length of the structural members. The distortion of the structure due to control forces is minimized by the use of high stiffness materials that have low density to reduce mass moments of inertia, which thereby reduce the control forces. Thus it may be appreciated that the ideal material would be one having zero thermal expansion, high elastic modulus, high strength, and low density.

When graphite/plastic composites are compared with aluminum, titanium, steel, invar, and beryllium, the composites are far superior in the characteristics desired. Beryllium is the only metal almost as stiff as the composites, but in thermal distortion the composites are as much as fifty times better than beryllium.

In the disclosed invention prepreg fiber-reinforced plastic tape is fed from reels into an apparatus to form the tape into a consolidated structural shape, such as a laminated strip, angle or channel to provide a continuous member of any lengths desired. The compact apparatus occupies only a fraction of the space required for pre-fabricated components. Complexity of large space structures and their assembly in space is substantially reduced due to the elimination of joints required for the sole purpose of fitting pre-assembled structure modules into the payload volume.

Thus it can be seen that the disclosed invention produces structural members which greatly simplify a deployed space structure, substantially reduce EVA, and with compact storage greatly reduce the number of earth-to-orbit flights required for placement of the space structure. Such structually efficient members clearly have utility on earth, such as for example in solar energy collecting devices, large antenna and other structures where low thermal distortion and high strengths-to-weight properties are required.

SUMMARY OF THE INVENTION

This objective, and others, are attained by an apparatus which locally heats a fiber-reinforced thermoplastic tape or strip, gradually bends or forms the strip along lines parallel to the length of the strip, then cools the strip while maintaining the desired shape. The apparatus may also bond several strips together to produce more complex structural shapes. If desired, means may be included to heat and consolidate unconsolidated fiber reinforced thermoplastic tape after, during, or prior to the shaping operations. This process is capable of continually and rapidly forming very long composite structural shapes. In outer space, this apparatus and process could be used to rapidly produce beams having lengths in thousands of feet.

BRIEF DESCRIPTION OF THE DRAWINGS

The advantages of the disclosed invention reside in the construction and cooperation of elements hereinafter described, reference being made to the accompanying drawings forming a part of this disclosure, wherein a preferred embodiment of the invention is shown by way of example. It should be understood, however, that the drawings and description are for the purpose of illustration only and are not to be construed as defining or limiting the scope of the invention.

In the drawings, wherein like numbers designate like parts throughout the various figures:

FIG. 7 is a cutaway view of the consolidator portion of the apparatus.

FIG. 8 is a manufacturing sequence and control circuit diagram of the apparatus.

DESCRIPTION OF THE PREFERRED EMBODIMENT

The invention has particular application in the art of forming and bonding of plastic, and as will be shown in the preferred embodiment disclosed herein, more particularly to the lamination, forming, and bonding of fiber-reinforced thermoplastic composite materials. Further, the embodiment is more specifically shown for a particular group of fibers and thermoplastics, and therefore it should be appreciated that the disclosed embodiment is by way of example only, and other arrangement, modifications, and applications of the invention will become apparent to those skilled in the art upon reading this disclosure, all of these being included within the scope and spirit of this invention.

Among the plastic matrices suitable for reinforcing with fibers are epoxy, polimide, and thermoplastic resins. Graphite fibers for reinforcing plastics include those based on polyarcrylonitrile precursors, and among these are Hercules Type A-S, Thornel T300, Morganite III, and Stackpole Panex 30/A. Resins include polypropylene, polycarbonate, polysulfone, polyarylsulfone, and polyethersulfone.

One of the important factors in the selection of a resin/fiber combination is to choose a resin that thoroughly wets the selected fiber so that a strong material is obtained during the consolidation process. Typical of such a combination is Type A-S graphite fiber/polysulfone, and this combination will be used herein by way of example to more clearly describe the invention.

Figure 1:
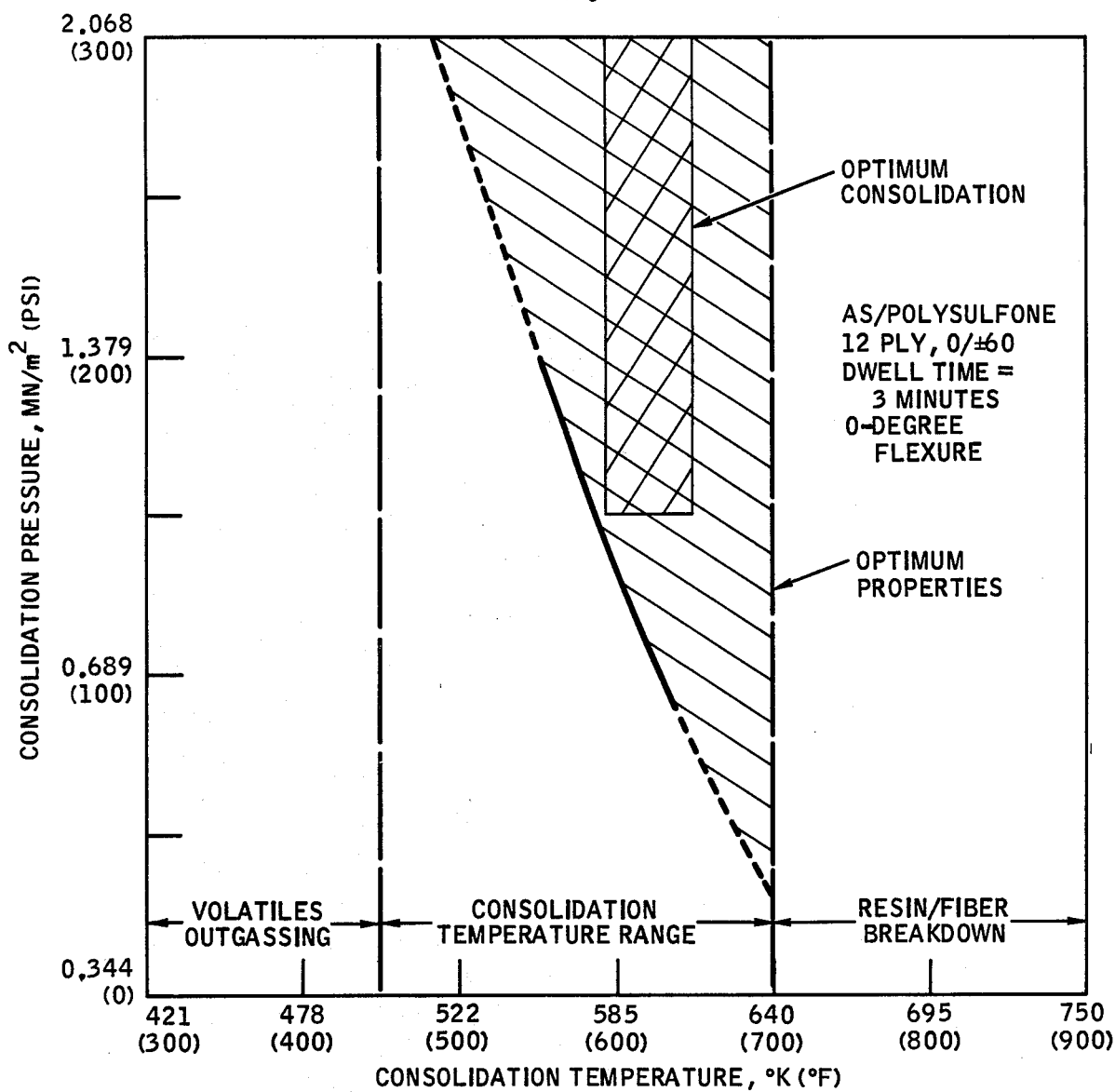
FIG. 1 is a graph of consolidation temperatures vs. consolidation pressures for a graphite/polysulfone material.

The resin/graphite composite has a glass transition temperature of 465 K (375 F). Volatiles in the material are largely eliminated by the time the material reaches a temperature of 505 K (405 F), and resin/fiber breakdown starts at 640 K (700 F). Effects of consolidation temperature on the flexure strength of laminates show that the greatest flexure strength is achieved at the higher consolidation temperatures. This is because the lower viscosity of the polysulfone at higher temperatures allows the material to fully wet the graphite fiber. Based on outgassing and flexure strength an optimum consolidation temperature range as seen in FIG. 1 for graphite/polysulfone is 585 K to 617 K (600 F–650 F). This temperature range enables the consolidated material to achieve maximum strength and remain free from outgassing volatiles. Referring now to FIG. 1 wherein is shown a zone of consolidation pressures and temperatures that yield material having optimum properties. It will be observed that optimum consolidation will be obtained in the 585K to 617K (600F–650F) with a consolidation pressure in excess of 1.034 MN/m$^2$ (150 PSI). For other resins, the optimum temperature range for consolidation and reshaping is similarly just above midway between the glass transition temperature and the temperature at which degradation of the fibers begins. For the purposes of this application, this temperature range will be referred to as the "consolidation temperature" for the materials selected.

Figure 2:
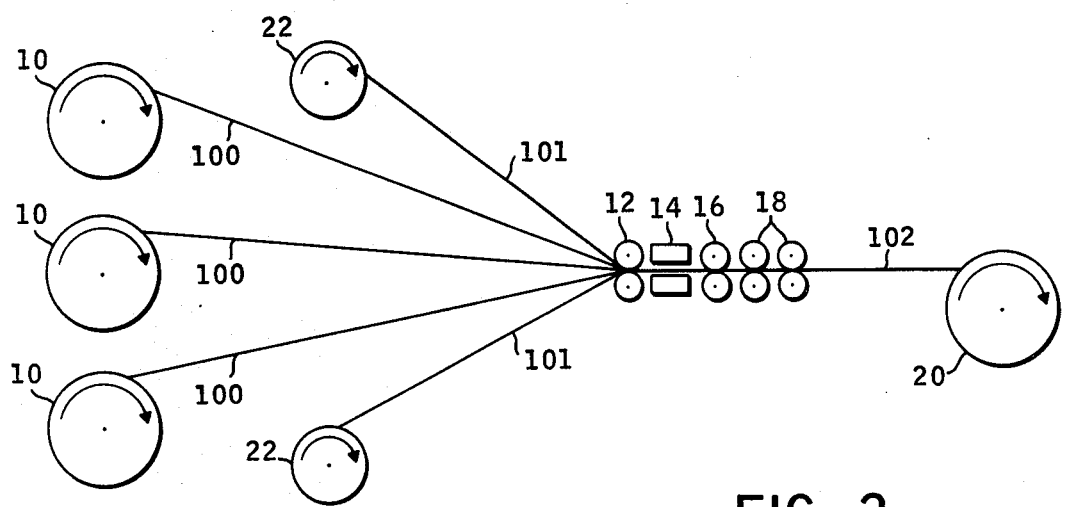
FIG. 2 is a schematic view of the manufacturing steps for a flat sheet strip lamination of composite material.

FIG. 2 is a schematic view of the method for consolidating a laminated strip of graphite/resin composite. Spools 10 containing graphite fabric 100 impregnated with resin hereinafter referred to as "prepreg", supply laminations to the consolidation apparatus. Any desired number of prepreg laminations 100 may be consolidated, FIG. 2 showing three spools 10, by way of example. The plurality of prepreg laminations are stacked together in close contact by collator rollers 12, which force any entrapped air from between the laminations.

Electrical resistance strip heaters 14 or other heating means heat the prepreg laminations 100 to the consolidation temperature before the prepreg reaches the heated consolidating rollers 16. Where a great number of laminations are to be consolidated the laminations may be subdivided into smaller stacks of laminations, each of these subdivided lamination stacks passed through strip heaters 14, then all the subdivided laminations stacks may be combined and passed through a second set of collator rollers 12 and strip heaters 14 before being passed on to the heated consolidating rollers 16. While all prepreg laminations are at the desired temperature rollers 16 consolidate the laminations by imposing the desired pressure, whereupon the laminations are immediately cooled below the glass transition temperature by a plurality of cooled rollers 18 which maintain pressure upon the laminations during the cooling process. The laminated composite material 102 is then stored on take-up reel 20 or passed on to the next manufacturing step.

For some desired uses of the composite a protective film 101, stored on spools 22, may be laminated to the exterior surface and consolidated thereon. Such a protective film may comprise a thermoplastic containing pigmentation to provide a pleasing color to the exterior surface. Pigmentations may also be utilized for a more functional purpose, as for example a white pigmentation such as titanium dioxide may be used to change the absorptivity/emissivity and ultraviolet radiation absorption characteristics of the material. Other temporary protective films, such as for example paper, may be placed on the exterior surfaces to prevent abrasion during storage or other manufacturing steps, or to prevent sticking of the material stored on take-up reels 20. For such utilization the film 101 would bypass the lamination steps and proceed directly from spool 22 to take-up reel 20. The process, which combines the steps of lamination, consolidation, and continuous reshaping of a graphite/plastic strip, will be identified for the purposes of this application as the "rolltrusion" process.

Figure 3:
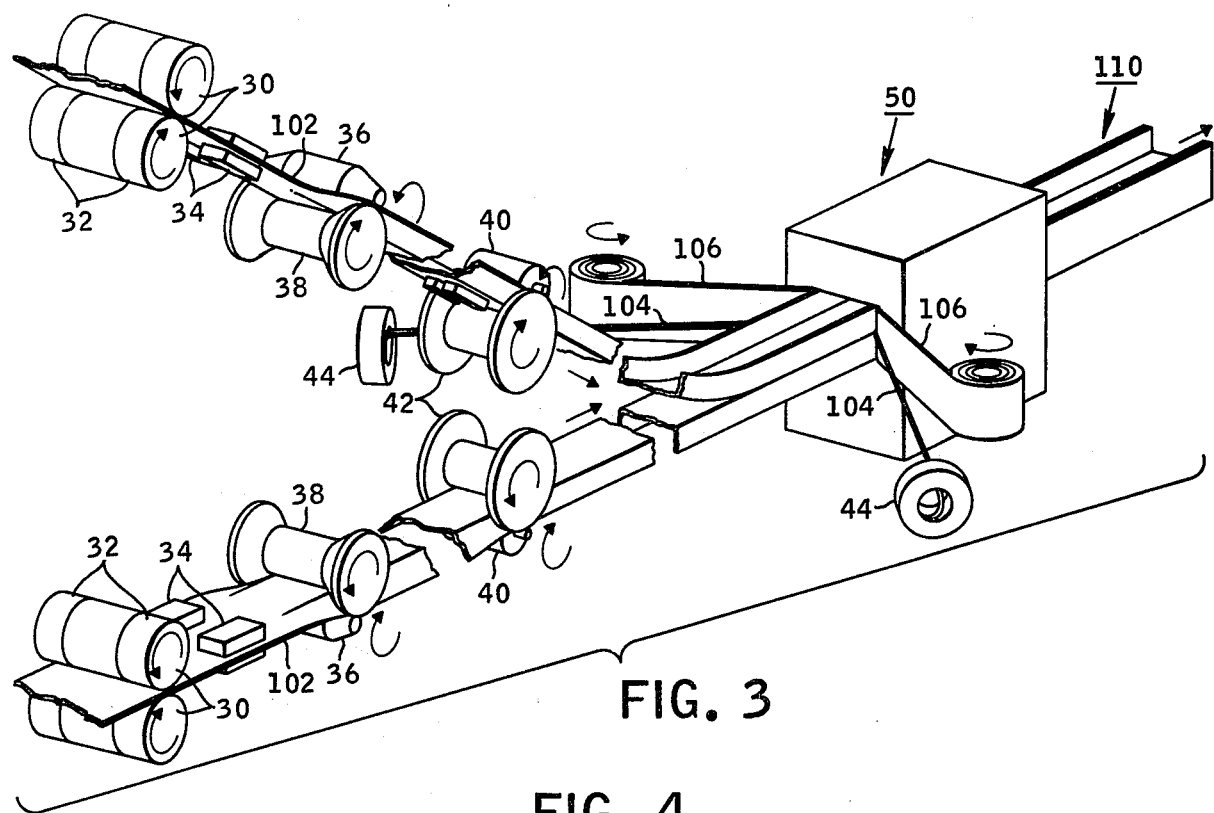
FIG. 3 is a schematic view of the manufacturing steps for a structural composite shape, such as an I-beam.

FIG. 3 is a schematic view of the rolltrusion of of two channels and the subsequent consolidation steps to form an I-beam 110. A composite strip 102, which was manufactured by the steps shown in FIG. 1 and may come directly from rollers 18, FIG. 2, is passed between a plurality of zone-heating rollers 30, wherein the rollers are hot in the edge areas 32. Strip 102 is then additionally heated locally by strip heaters 34 to bring the localized temperature of strip 102 to the glass transition temperature. The strip is subsequently passed between a plurality of rolltrusion rollers 36, 38, 40, and 42 to progressively bend the outer edges of strip 102 into an upstanding position to thereby form a channel-section. The function of these forming rollers may be more clearly seen in FIG. 4.

Figure 4:
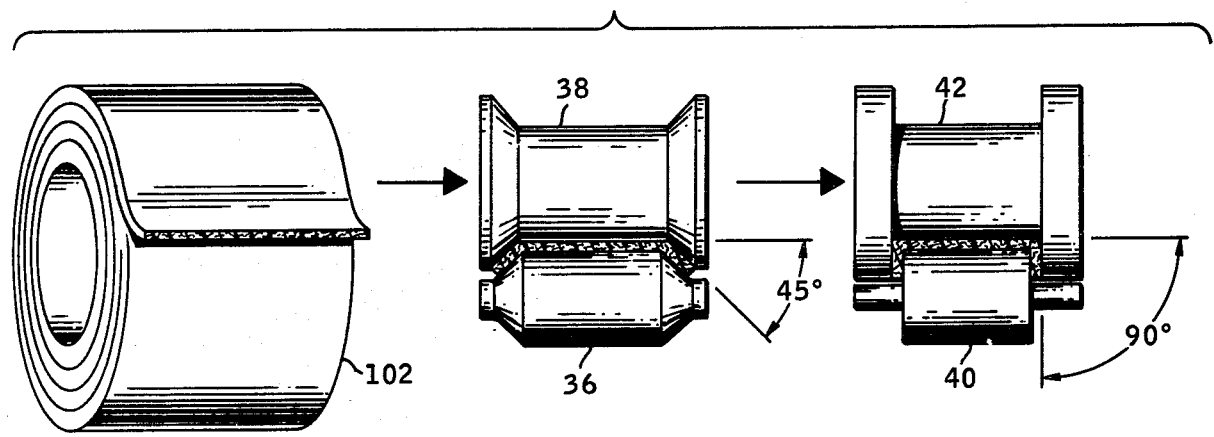
FIG. 4 is a flow diagram showing cross-sections of "rolltrusion" rollers.

FIG. 4 is a flow diagram in which cross-sections of rolltrusion rollers 36, 38, 40 and 42 are shown. In this embodiment the strip is formed by two progressive steps, the first set of rollers 36 and 38 bending the edges 45° and the second set of rollers 40 and 42 bending the edges to a 90° position to form a channel. Any number of forming rollers utilized in any desired number of progressive steps may be employed to form the exemplary channel.

While FIGS. 3 and 4 show the production of an I-beam by forming channels and laminating them with sap strips any other suitable shape such as channels, angles, hat sections, etc. may be manufactured in a similar manner. Also, any other suitable heating means may be used in place of heated edge strips 32 and strip heaters 34. For example zonal heating may also be achieved with radiative heat lamps.

Figure 5:
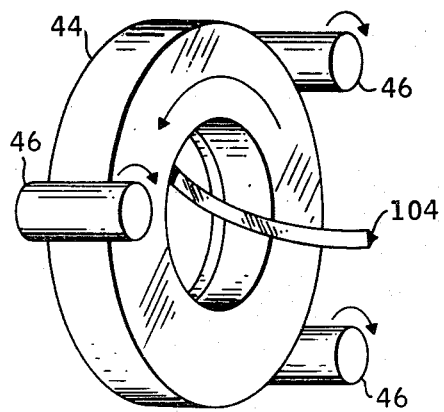
FIG. 5 is a view of a material storage reel.

Referring again to FIG. 3, it will be seen that two channels are then brought together in close contact in a back-to-back relationship. A welt 104 is brought into contact with each set of contiguous channel flanges and covered by a cap strip 106 before entering the consolidator 50. Both the welts 104 and cap strips 106 are of a composition similar to composite strips 102. Welt 104 is stored in reel 44, more clearly shown in FIG. 5, and is delivered to the machine by rotating reel 44 with a plurality of driving spindles 46.

Figure 6:
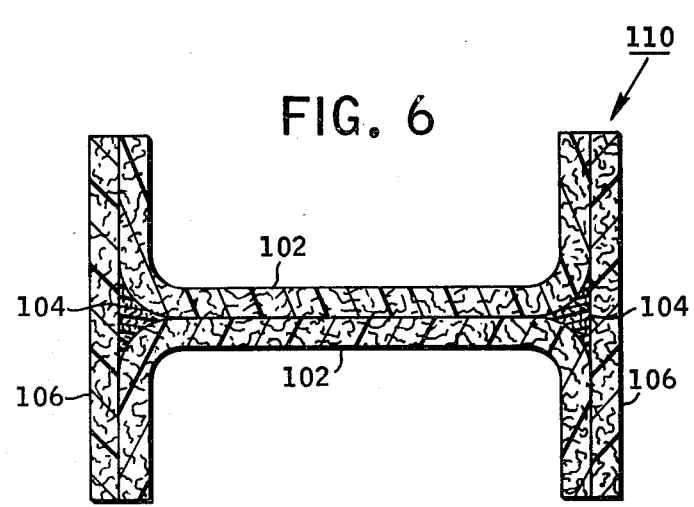
FIG. 6 is a cross-section of an assembly of composite material elements forming an I-beam.

FIG. 6 is a cross-section of the I-beam 110 which more clearly shows the elements being assembled, comprising two channels 102, two welts 104, and two caps 106. The welt 104 is shaped to fill the cavity formed by the radii of channels 102 and cap strip 106. FIG. 7 is a cutaway view of consolidator 50, wherein certain parts have been omitted to more clearly show the consolidation steps. Elements 102 are guided along guideways 51 and 53, while elements 106 are fed into consolidator 50 along the outside of guideways 51 and 53, as schematically shown in FIG. 3. The preassembled material elements are brought into close contact, to form the arrangement shown in FIG. 6, at the entryway of consolidation dies 52 and 54. These consolidation dies are heated by resistant heat rods sufficiently to bring all composite elements 102, 104 and 106 up to the required consolidation temperature, and pressure is applied to the I-beam 110 exterior surfaces by means of compression springs 60 arranged to load the consolidation dies 52 and 54 and side pressure platens 56 and 58. The consolidated I-beam 110 is then immediately transported to cooling blocks 62 and 64, which are cooled by conductive fluid loop/radiative means to bring the temperature of I-beam 110 below the glass transition temperature while springs 60 maintain a consolidation pressure on the I-beam section.

Returning now to FIG. 3, it will be recalled that the composite materials introduced into the machine may come directly from the manufacturing steps described in FIG. 2, or from storage containers or reels. The preimpregnated and preconsolidated graphite/thermoplastic strip materials 102 and 106 and welt 104 should be uniformly dispensed from their respective storage containers, and to maintain uniform material properties during forming and consolidation, a constant tension should be applied to the materials. It is preferred to store materials wound in sufficiently large radii that heating of the material is unnecessary to prevent damage during unwinding caused from excessive flexure. Storage reels and rollers utilized at certain manufacturing steps are provided with rolling resistance by the use of hub friction to assure the strip composite material will remain tightly coiled on the reel and will have a constant feed tension through the various steps of manufacture.

By the use of either heated roller edges 32, strip heaters 34 or a similar heating means, only those areas of strip 102 to be formed or bent are initially heated. This saves heat energy as well as permitting the cooler temperature, and stronger, areas of the composite strip to carry the feed tension load.

Various methods of heating the composite material may be used including microwave, radio frequency, inductive heating, and resistance heating. For many applications, because of its energy efficiency and availability, resistance heating is preferred, however there are conditions in which other forms may be more desirable.

Microwave heating is a technique that may reduce the energy required to form graphite/thermoplastic material. These savings are caused by the fact that the microwave energy heats the material directly, which results in fast heatup rates and, if compatible tooling is used, low heat losses due to tool heatup. Automated layup and microwave cure of graphite/epoxy have proven successful.

Radio frequency heating reduces the energy and time required to form graphite/polysulfone. In this technique the tooling forms the plates of a capacitor, and polysulfone becomes the dielectric medium between these plates. The RF energy stored in the capacitor is dissipated directly in the polysulfone (dielectric). If this heating takes place at a very rapid rate, the energy conducted to the tooling is minimized, yielding a highly efficient process. The tooling requirements are less severe than those for microwave heating since, by proper tool and electrode design, the RF fields within the tool can be reduced to near zero. The technique has been successfully used in curing graphite/epoxy laminates. The dielectric properties of the polysulfone will determine the heating rates that can be achieved. These in turn will influence the effectiveness of the method and tool requirements.

The RF heating phenomenon is based upon the dissipation of energy in a dielectric medium in an electromagnetic field. A high-loss material can be heated directly by this technique and is desirable. Low loss materials require a high-loss secondary medium to act as a heating element to indirectly heat the low-loss material.

Although the dielectric properties play the dominant role, there are other important factors. Those having an impact on forming include, tooling requirements, heat loss methods, material compatibility, power requirements, instrumentation methods, equipment costs, and methods of coupling the energy to the electrodes. Forming operations may in addition be affected by the geometry of the shape being formed, particularly with a low-loss thermoplastic material.

Heating by electrical resistance elements in contact with the composite material is the preferred method, either localized heating with strip heaters such as heaters 34 in FIG. 3, or with thin metallic bands in contact over the full width of the material when required. By combining electrical resistance heat generation with conduction heat transfer, most combinations of rollers and platens may be accommodated. Power efficiency is high and temperature control is relatively simple.

FIG. 8 is a flow diagram showing the sequenced manufacturing steps and a circuit diagram of the monitor and control systems of an apparatus simplified for clarity to show only the rolltrusion technique for forming and consolidating a channel-section beam. The composite strip is heated by the localized resistance heaters 34, and by means of temperature sensors the fabrication control unit 71, typically including conventional micropresser and power controls, will control application of heater power to maintain the composite strip at 603±14 K (625±25 F). Correct heater temperature is attained during the apparatus warmup and must be maintained throughout the beam forming process. Another conventional monitor/control loop, not shown, is utilized for controlling composite strip temperature through the rolltrusion rollers 36, 38, 40 and 42. Material cooling while passing through cooler platen 64 reduces the material temperature to below 422 K (300 F) after forming. Temperature is monitored by temperature measuring means 73 and 75. A conventional control means 77 monitors and controls flow of coolant through cooling platen 64 to provide selected cooling rates.

The stop/start and speed control 79 of the feed rollers 68 controls the forming rates which are relatively slow, and in the exemplary I-beam process would be approximately three meters per minute, or approximately 200 meters per hour. The beam length sensor 70 is used to record beam length and activate a conventional beam cutter 72 when desired beam length is achieved.

Methods of cutting graphite/polysulfone composites include laser cutting, saw cutting, shearing and punching. Relatively heavy laminations of graphite/polysulfone composites may be cut by shearing or punching without deleterious effects and with relatively low power inputs. Shearing has the advantage of being a debris-free process which is a significant advantage for fabrication operations in outer space.

From the foregoing description of the construction and arrangement of the disclosed apparatus and process it will be apparent to one skilled in the art that the objects of the invention have been accomplished and that the herein described apparatus has the capability of manufacturing continuous structural members of extremely long lengths by laminating composite sheets or strips which are thereafter heated to the glass transition temperature or above for forming if required and then subsequently heated to a consolidation temperature for forming and consolidating into a high-density structural member which is thereafter cooled to below the glass transition temperature while subjected to consolidation pressure.

It should be understood from the foregoing that many different embodiments of the disclosed invention may be made without departing from the spirit and scope of the invention, and the embodiment of the invention disclosed herein is by way of example only and is not to be taken as a limitation.

We claim:

1. An apparatus for continuously forming elongated structural shapes from fiber reinforced thermoplastic strips which comprises:

drive means for continuously moving a plurality of dry fiber reinforced thermoplastic strips from supply rolls through the apparatus;

at least one first heater roller set having heating means located in selected narrow rings around the roller surfaces to heat areas of a first strip passing through said roller set only along lines parallel to the strip longitudinal edges;

at least one first plurality of reshaping roller sets, each set having complimentary shapes for changing the cross-sectional shape of the first strip in steps, said reshaping occurring only in the linear heated areas;

means to continuously feed at least one second strip into contact with said first step;

consolidating heating means for receiving said first and second strips, including a first plurality of opposed spring-loaded platens to compress the contacting areas of said strips together to form a structural member and heating means to heat said strips to the consolidation temperature range of said thermoplastic as said strips move continuously through said first platens;

cooling means for receiving the resulting structural member from said consolidating heating means comprising a second plurality of opposed spring-loaded platens engaging said member to maintain the shape of said member and cooling means cooling said member to return said member to a temperature below the thermoplastic consolidation temperature range as said member moves continuously through said second platens.

2. The apparatus according to claim 1 further including in advance of said consolidation heating means:

at least one second heater means to heat areas of at least one of said second strips along lines parallel to the strip edges; and at least one second plurality of roller sets, each set having complementary shapes for changing the cross-section of said heated second strip.

3. The apparatus according to claim 2 wherein said first and second roller sets each includes a final roller set forming said strips into channel configurations, said means for bringing strips together brings said channels into back-to-back contact and said apparatus further includes immediately before said consolidation heating means:

means to bring welts into contact with the outer line of contact between said channels; and means to bring fiber reinforced thermoplastic cap strips into contact with the outer surface of the channel flanges;

whereby a continuous structural shape having an I-beam cross-section results.

4. The apparatus according to claim 3 wherein each plurality of roller sets includes at least two pairs of complementary roller pairs, the shape of the space between the final pair corresponding to the desired structural shape and the shape of the spaces between the other roller pairs step-wise changing between rectangular and the desired structural shape.

5. A method of manufacturing a structural beam having an I-beam cross-section from strips comprising graphite fibers embedded in a thermoplastic resin matrix which comprises the steps of:

heating areas parallel to longitudinal edges of two graphite/thermoplastic strips to the consolidation temperature range of the resin;

passing each of said strips through sets of rollers, each set having cooperating shapes which bend said strips along said heated areas to stepwise change the cross-section of each strip from rectangular to a channel section;

bringing the two resulting channel sections together in a back-to-back relationship with the channel flanges in a planar relationship;

bringing two graphite/thermoplastic welts into contact with the outer line of contact between channel backs;

bringing two graphite/thermoplastic cap strips into contact with said channel flanges;

pressing together said channel sections and strips while heating them to the consolidation temperature range of said thermoplastic, for a time sufficient for consolidation and bonding; and cooling said resulting I-beam to a temperature below the glass transition temperature of the resin structural shape while applying shape-maintaining pressure until the temperature is below the glass transition temperature of the thermoplastic.

* * * * *